Oct. 18, 1932.  G. D. SUNDSTRAND  1,883,832
OIL BURNING EQUIPMENT
Filed May 9, 1929  2 Sheets-Sheet 1

Inventor:
G. D. Sundstrand,
By Churchill Parker Carlson
Attys.

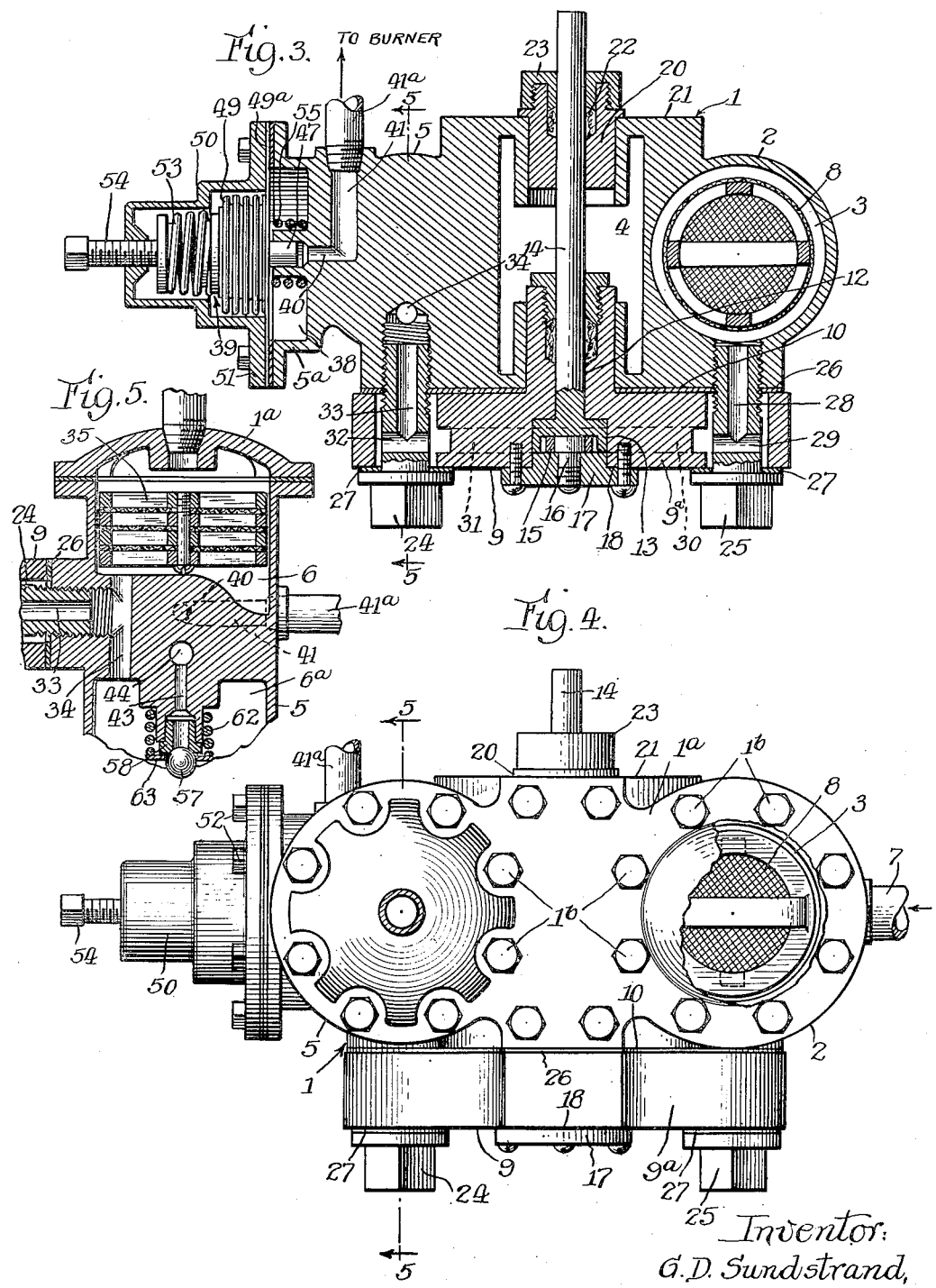

Patented Oct. 18, 1932

1,883,832

UNITED STATES PATENT OFFICE

GUSTAF DAVID SUNDSTRAND, OF ROCKFORD, ILLINOIS, ASSIGNOR TO THE SUNDSTRAND ENGINEERING CO., OF ROCKFORD, ILLINOIS, A CORPORATION OF ILLINOIS

OIL BURNING EQUIPMENT

Application filed May 9, 1929. Serial No. 361,596.

The invention relates more particularly to a pumping and pressure controlling device for use in connection with an oil burner or other liquid fuel consuming apparatus.

The oil pumping and pressure controlling devices used heretofore have been costly, bulky, unsightly and extremely troublesome due to the leakage of oil. Generally the oil pumping and pressure controlling mechanism has comprised a plurality of devices mounted in comparatively remote relation to each other on various parts of the oil burner frame and have been connected together by a great deal of piping entailing a large number of joints. The piping has been exposed and, together with the plurality of separate devices, has presented an unsightly appearance. Due to the faulty joints and the packing on the pump, and the large number of connections between the pump and the various pressure controlling and straining devices, it has been practically impossible to eliminate leakage. The result has been that the oil pumping and pressure controlling mechanism of an oil burner has been a constant worry and despair because of the difficulty in keeping it in proper operating condition. Furthermore, the cost of the separate devices and the expense involved in connecting them up and keeping the connections tight, has greatly increased the cost of manufacture and also that of installation and upkeep.

It is the general object of the invention to avoid these many disadvantageous and troublesome features heretofore present and to combine the oil pumping, straining and pressure controlling devices in a unique manner so as to simplify the construction and improve the appearance of the oil burner equipment and to avoid the possibility of oil leakage.

Another object is to provide a unitary structure having a casing embodying the oil pumping, straining and controlling devices, wherein the oil pump is mounted on the casing and is driven by means of a shaft extending outwardly from one side of the casing, a bearing being provided for the inner end of said shaft adjacent the pump and arranged so that oil leaking through the bearing drains into the casing.

Another object is to provide a device of this character in which any oil leaking from the pump bearing drains into a return by-pass for the pump and in which the oil is at a low pressure, so as to avoid any leaking of oil to the outside of the device.

Another object is to provide such a pumping and pressure controlling device comprising a hollow casing through which the oil is conducted by means of ports passing through walls of the casing and on which detachable parts are secured by means of flat joints rather than by threads, so as to permit of efficient sealing of the joints to prevent leakage.

A further object is to provide such a unit of compact and rigid construction so as to require but a small amount of space and which will be extremely quiet in operation.

In pursuance of the foregoing objects I aim to provide a pumping and pressure controlling device comprising a casing of neat outward appearance, having a passage therethrough, means to pump oil through said passage, means to strain the oil, and means to control the discharge of oil from the device and the pressure at which the oil is discharged.

Further objects and advantages of the invention will be understood from the following detailed description taken in connection with the accompanying drawings in which:

Fig. 3 is a horizontal section along the line 3—3 of Fig. 2.

Fig 4 is a plan view of the device shown in Fig. 1 with a portion broken away to show one of the strainers.

Fig. 5 is a transverse fragmental section along the line 5—5 of Figs. 3 and 4.

Figure 1:
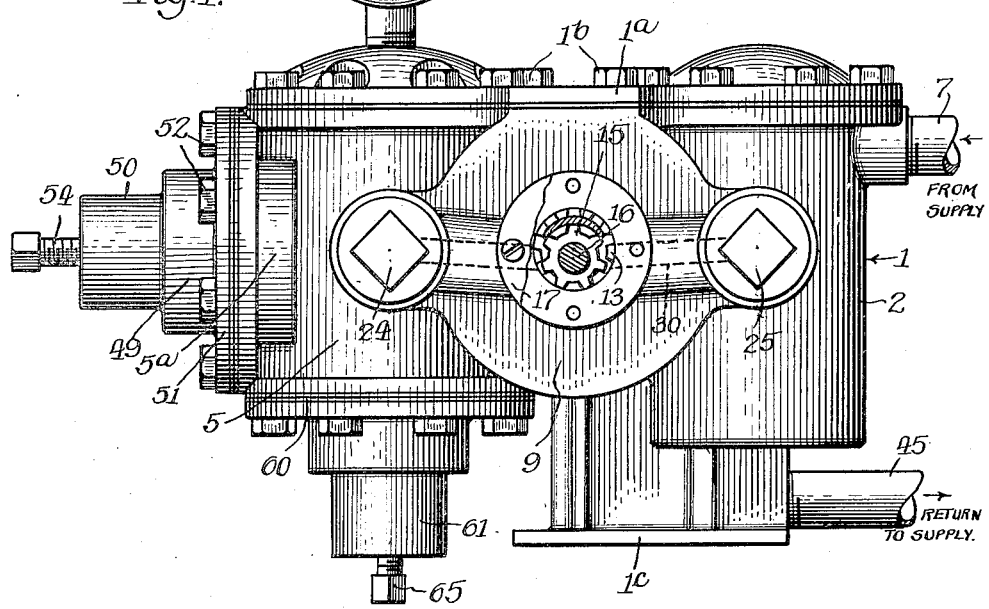
Fig. 1 is a front elevation of a preferred form of the invention, a portion being broken away to show the gear pump.

While I have shown in the drawings and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

Generally the invention contemplates the provision of a casing arranged to be mounted on the frame work of the oil burner and having an intake port for connection to the oil supply tank, an outlet port for connection to the burner and a relief passage for connection to the oil supply tank serving as a by-pass or a return. Contained in this casing is a gear pump adapted to draw oil from the supply tank and force it out to the burner under pressure, together with means for straining the oil and for controlling the passage of oil to the burner and the pressure at which the oil is delivered to the burner. Preferably a relatively coarse suction strainer, as for example one of about 80 mesh, is positioned intermediate the intake port and the pump to strain all of the oil passing into the unit and primarily to remove from the oil any foreign matter which may have been present in the piping intermediate the unit and supply tank when the equipment was first installed. A second strainer of finer mesh is positioned on the outlet side of the pump to strain only the oil which passes directly to the burner (any oil that is by-passed returning to the tank without passing through the second strainer). Automatic control mechanisms are provided arranged to control the outlet port so that no oil is fed to the burner until the oil reaches a predetermined minimum pressure (for example, 50 to 60 lbs.), and to by-pass oil back to the supply tank when the pressure exceeds a predetermined maximum (for example 100 lbs.).

In addition to the novel and compact arrangement of these devices in the casing and the improved construction and operation obtained thereby, the invention in its preferred form also avoids any trouble due to the leakage of oil through the pump bearing by draining this bearing into the return by-pass.

In the exemplary form shown for purposes of disclosure, the invention comprises generally a casing 1 of a somewhat symmetrical and pleasing outward appearance as is evident from Figs. 1 and 4, and which is provided with a mounting portion or bracket $1^c$ for securing the casing to the frame work of the burner equipment. As illustrated in the drawings the casing has a pair of laterally spaced vertically positioned cylindrical portions 2 and 5 and an intermediate web portion providing a chamber 4. The cylindrical portion 2 has an inlet port adapted for connection to an intake pipe 7 and is preferably hollow to form a chamber 3 for a suction strainer 8 (Fig. 2) which is supported therein by means of an annular ledge 9.

Figure 2:
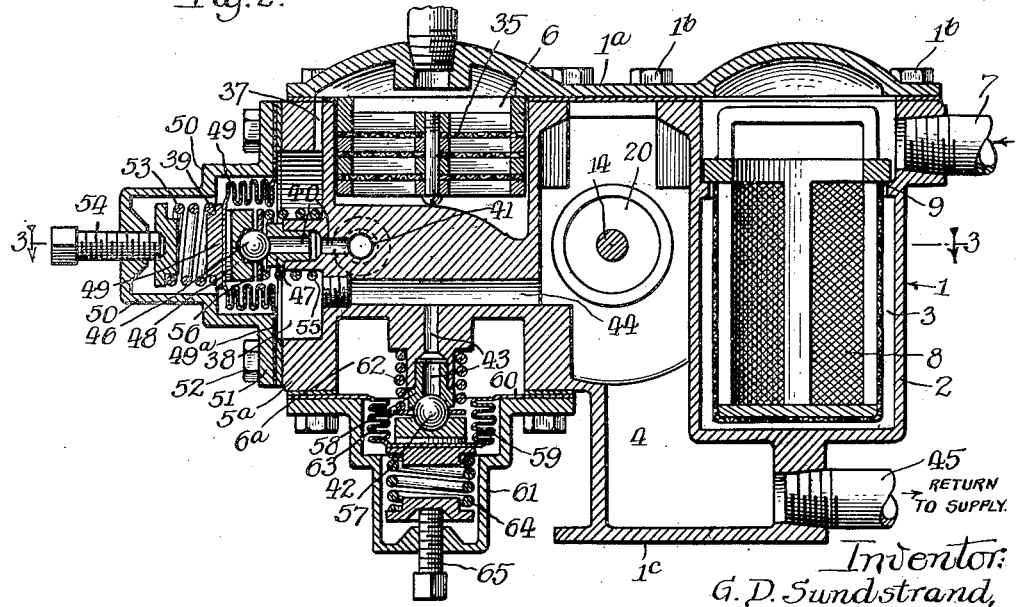
Fig. 2 is a vertical central section through the device shown in Fig. 1.

The cylindrical portion 5 is enlarged at $5^a$ to form the left end wall of the casing as viewed in Figs. 1 to 3, and has a recess 6 in its upper end. The top wall of the casing is herein illustrated in the form of a cover plate $1^a$ which has a flat surface joint with the body of the casing and is secured thereto by a plurality of screws $1^b$, with a suitable gasket therebetween.

The chamber 4 as hereinafter more fully described, contains oil at low pressure which is by-passed back to the supply tank when the outlet pressure of the unit reaches a predetermined maximum. The invention contemplates the provision of an oil pump having but a single bearing subjected to the oil under high pressure and that this bearing will be so positioned that any oil leaking therethrough will pass into said chamber 4. In the preferred form of the invention, this is accomplished by having the high pressure bearing of the pump drive shaft positioned between the pump and the chamber 4.

The gear pump elements are carried on or mounted in a recess in the front wall of the casing (Figs. 1 and 3), the drive shaft of the pump extending transversely through the chamber 4 and being supported by suitable bearings mounted on the front and rear walls of the casing. Ports connecting the intake side of the pump with the suction strainer chamber 3, and the outlet of the pump with the strainer chamber 6, extend through walls of the casing 1 to form the oil passage between the intake and outlet of the unit. As illustrated herein the pump is mounted in the front wall 9 of the casing and comprises an internal gear 13 (Fig. 3) carried on a shaft 14 extending inwardly through a bore 12 in the front wall, through the chamber 4 and out through the rear wall 21 of the casing. The pinion 15 of the pump is rotatably mounted on a pin 16 carried on a detachable end plate 17 which has a flat surface joint 18 with the front wall 9. A bearing is thus provided for the shaft 14, by the bore 12, intermediate the gear 13 and chamber 4 so that any oil leaking through this bearing lubricates the bearing and passes into the chamber 4. The other end of the shaft 14 is rotatably supported by means of a bushing 20 secured in the rear wall 21, suitable packing 22 being provided in a stuffing box formed between the bushing 20 and a detachable end cap 23. As this bearing is subjected only to the low pressure oil, if any, in the chamber 4, it is not difficult to prevent leakage therethrough.

Oil is conducted from the strainer chamber 3 to the intake side of the pump by means of a passage 30 (Fig. 3) extending therebetween through the intermediate casing walls. Similarly oil is conducted from the outlet side of the pump through a passage 31 extending therefrom and communicating with a vertical port 34 (Figs. 3 and 5) which connects at one end with the strainer recess 6.

Although it is contemplated that the front wall 9 of the casing may be formed wholly as an integral part thereof, I have illustrated an exemplary form of the invention wherein the front wall of the casing is shown as embodying a detachable plate 9ª which serves as a detachable mounting for the pump and which is secured to the body of the casing by means of a pair of headed screws 24 and 25. A gasket 26 is preferably provided between the plate 9ª and the casing surface 10 to seal that joint, and additional gaskets 27 are provided intermediate the flat surfaced heads of the screws 24 and 25 and the outer flat surface of the plate 9ª. The screw 25 has a central longitudinal passage 28 (Fig. 3) and a transverse port 29 which form portions of the passage 30 to carry oil from the strainer chamber 3 to the gear pump. Similarly a transverse port 32 and a longitudinal passage 33 in the screw 24 form portions of the outlet passage 31 from the pump.

The oil discharged from the pump is intended primarily to be fed to the burner, and to this end flows through the passage 31, through the upper portion of the port 34 and through an automatically controlled outlet passage hereinafter more fully described. Since it is desirable to feed oil under uniform pressure to the burner, an automatically controlled by-pass is provided which conducts oil from the lower portion of the passage 34 when the oil reaches a predetermined maximum pressure, through the chamber 4 and the return outlet.

As disclosed herein, the outlet passage from the upper end of the port 34 (Fig. 5) includes the recess 6 (provided with a strainer 35 through which the oil is forced), a vertical port 37 (Fig. 2), a recess 38 in the left end wall 5ª of the casing, and ports 40 and 41 (Figs. 2 and 3). The automatic control device for the outlet passage is designated generally as 39 (Figs. 2 and 3) and is mounted on the end wall 5ª of the casing to control the passage of oil from the recess 38 to the outlet ports 40 and 41. An automatic pressure control device designated generally as 42, is mounted on the lower end of the cylindrical portion 5 of the casing and is arranged to by-pass oil from the lower end of the port 34, through a recess 6ª and thence to the chamber 4 through ports 43 and 44. Thus if the pressure on the outlet side of the pump becomes excessive, oil is by-passed to the chamber 4 from whence it may flow through a pipe 45, to the oil reservoir (not shown).

The automatic control device 39 is preferably constructed so that it will not open the outlet passage until the pressure of the oil discharged from the pump reaches a predetermined amount, as for example, 50 to 60 lbs., the pressure control device 42 being set for a higher pressure, say, 100 lbs. The control device 39 is also arranged to close the outlet passage if the pressure falls below said predetermined 50 to 60 lbs. This insures that the oil fed through the outlet pipe 41ª will always be under a pressure of from 50 to 100 lbs. The control device 39 is mounted on the casing 1 so that its pressure-sensitive mechanism may be acted upon by oil from the outlet side of the pump.

As illustrated in the drawings, the control device 39 (Figs. 2 and 3) comprises a ball valve 46 normally seated against the end of a bushing 47 the bore of which forms a portion of the port 40. The valve 46 is mounted in a recess in a block 48 carried on the inner end surface of a metallic bellows device 49, the other end of which has an outwardly extending flange 49ª adapted to be clamped against the end of the casing. A cup-shaped enclosing and supporting member 50 is arranged to house the control device 39 and is provided with an annular flange 51 positioned against the flange 49ª of the bellows device and secured to the casing by means of a plurality of screws 52.

The valve 46 is normally held against the bushing 47 by means of the bellows device and a coiled spring 53 positioned intermediate the outer end of the bellows device and an adjusting screw 54 mounted in the end of the cup-shaped housing 50. The pressure of the spring 53 is adjusted so that the valve will be actuated when the oil in the outlet passage reaches a predetermined minimum pressure such as the 50 to 60 lbs. herein given as an example. Preferably a coiled spring 55 is provided to press outwardly on the ball through an intermediate washer 56, to insure unseating of the ball valve.

The pressure control device 42 is herein shown as somewhat similar to the pressure control device 39, the main difference being in the pressure for which it is adjusted. Thus it comprises a ball valve 57 arranged to seat against a bushing 58 (Figs. 2 and 5) which forms the end of the port 43. This valve is mounted on a metallic bellows device 59 having an outwardly extending flange 60 secured against the lower end of the cylindrical portion 5 of the casing and clamped thereto by means of a cup-shaped housing member 61. The valve 57 is adapted to be unseated by means of a coiled spring 62 which presses outwardly on the valve through an intermediate washer 63. The valve is normally held in its seated position by means of a coiled spring 64 positioned intermediate the outer end of the bellows device and an adjusting screw device 65 mounted in the end of the cup-shaped member 61. Since the oil from the pump passes into the recess 6ª through the port 34 under the same pressure as the oil which passes into the recess 6, the control device 42 may be adjusted to control the maximum outlet pressure of the unit.

In operation it is contemplated that the intake pipe 7 will be connected to a suitable supply of liquid fuel (not shown) and that the outlet pipe 41ª will be connected to the liquid fuel consuming device. The return pipe 45 is also connected to the fuel supply. It is intended that the drive shaft 14 be driven at a constant speed, the pressure of the fuel discharged through the outlet pipe 41ª then being determined by the automatic control devices.

It is to be understood that the term "casing" as used herein designates the entire structure within which the elements of the device are mounted and includes the various members herein disclosed as being detachably secured to the body portion of the casing.

The many advantages of the device are believed manifest. By combining in a novel manner, the pump, strainers and automatic pressure control devices, and incorporating them in a single casing, the passage for the fuel is combined within the casing and permits of a construction particularly adapted to prevent leakage. In the preferred form illustrated the invention not only prevents leakage of fuel from the passage connecting the several devices but also prevents outward leakage from the high pressure bearing of the pump.

I claim as my invention:

1. A device of the character described comprising, in combination, a casing having an inlet passage and an outlet passage, a pumping device mounting member forming a portion of one wall of the casing and having a flat surface joint with the remainder of the casing, a pumping device carried on said member, inlet and outlet ports in said member for the pumping device and means securing said plate to the remainder of the casing comprising screws having passages therethrough communicating with said inlet and outlet ports in said member and with the said inlet and outlet passages.

2. A device of the character described comprising, in combination, a casing having a pair of laterally spaced vertically positioned cylindrical portions with an integrally formed web therebetween and having chambers formed in and opening through corresponding ends of said cylindrical portions, a strainer removably positioned in each chamber, removable closure means for said chambers having a flat surface joint with the ends of said cylindrical portions, a pump carried by and positioned on one side of said web and having a drive shaft journaled in said web, said shaft extending through said web for connection with a power source on the other side of the web, and said casing having a passage therethrough communicating with said pump and including said chambers.

3. In a device of the character described, comprising a casing having two laterally spaced vertically positioned cylindrical portions and an integrally formed connecting web therebetween, said cylindrical portions having chambers formed in and opening through the corresponding ends thereof, a strainer removably positioned in the chamber in each one of said cylindrical portions, removable closure means for the chambers of said cylindrical portions, a pump detachably secured on one side of said web and having a shaft extending through said web for connection with a power source on the other side of said web, said casing having intake and discharge passages formed therein communicating with said pump and both of said chambers whereby to permit said pump to draw liquid from one of said chambers and discharge it into the other of said chambers, and a control device having a flat surface joint with said casing and arranged to control the flow of fluid from said other chamber.

4. In a device of the character described, comprising, in combination, a casing having two laterally spaced vertically positioned cylindrical portions having an integrally formed connecting web therebetween, said cylindrical portions having chambers formed therein opening through the upper ends thereof, a strainer removably positioned in each of said chambers, removable closure means for said chambers, a pump detachably secured on one side of said web and having a shaft extending through said web for connection with the power source on the other side of said web, said casing having a passage therethrough communicating with said pump and including both of said chambers, and a control device communicating with one of said chambers and having a flat surface joint with the lower end of the cylindrical portion in which said last mentioned chamber is formed.

5. A device of the character described having a casing with two laterally spaced vertically positioned cylindrical portions connected by an integral web, a first one of said cylindrical portions being formed to provide flat surfaces at its opposite ends and a flat surface on one side thereof, the second one of said portions having a flat surface at one end thereof and a chamber formed therein opening through said flat surface, a removable strainer in said chamber, removable closure means for said chamber clamped against the flat surface through which said chamber opens, a pump carried by said web, means providing a passage from said chamber to said pump, a pressure control device mounted on one of the flat end surfaces of said first cylindrical portion, said casing having passages formed therein leading from said pump to said control device, said first cylindrical portion having a chamber formed therein opening through the other flat end surface thereof, said casing having a passage therein communicating with said pump and said last mentioned chamber, a strainer in said last mentioned chamber, said casing having a discharge opening for said last mentioned chamber and a control device mounted on the flat side surface of said first cylindrical portion operable to control the flow of fluid from said last mentioned chamber.

6. In a device of the character described, comprising a casing having two transversely spaced cylindrical portions and an integrally formed connecting web therebetween, said cylindrical portions having chambers formed in and opening through the corresponding ends thereof and said web having a by-pass chamber formed therein, a strainer removably positioned in the chamber in each one of said cylindrical portions, removable closure means for the chambers of said cylindrical portions, a pump carried by and positioned on one side of said web and having a shaft extending through said web and said by-pass chamber for connection to a power source on the other side of said web, said shaft being journaled in said web by two bearings spaced longitudinally of said shaft and positioned on opposite sides of said by-pass chamber, said casing having passages therein from one of said chambers to said pump and from said pump to the other chamber.

7. A device of the character described comprising, in combination, a casing having a pair of laterally spaced cylindrical portions having chambers formed therein and having an integrally formed connecting web therebetween, a strainer removably positioned in each of said chambers, means for closing said chambers, said web having a by-pass chamber formed therein, a pump mounting member detachably secured on one side of said web, a pump carried by said member and having a shaft extending from said member and through said web, a high pressure bearing for said shaft carried by said member and extending into said by-pass chamber, and a low pressure bearing carried by said web and supporting said shaft at a point spaced longitudinally from said high pressure bearing, the portion of said shaft between said bearings being positioned in said by-pass chamber and said member having intake and discharge passages formed therein for said pump, one communicating with each of said chambers.

8. A device of the character described comprising, in combination, a casing having an inlet passage and an outlet passage, said casing having a flat surface on one side thereof, and also having a pair of spaced tapped openings extending into said casing through said flat surface and communicating one with each of said passages, a pump mounting member having a flat surface adapted to abut said flat surface on said casing, a pumping device carried by said member, inlet and outlet ports formed in said member for said pumping device, each of said ports including a transverse bore formed in said member and each opening at one end through said flat surface of the member, one of said bores being coaxial with each of said tapped openings, said member having flat surfaces about the other end of said bores and perpendicular thereto, a pair of screws one extending through each of said bores and threaded into said openings, said screws having passages therethrough extending from the inner ends thereof into said bores, and a part of the screws within said bore being of less diameter than said bores, and heads on said screws having flat surfaces thereon adapted to abut the last mentioned flat surfaces on said member to hold said member in position and close the adjacent ends of said bores.

In testimony whereof, I have hereunto affixed my signature.

GUSTAF DAVID SUNDSTRAND.

CERTIFICATE OF CORRECTION.

Patent No. 1,883,832.   October 18, 1932.

GUSTAF DAVID SUNDSTRAND.

It is hereby certified that error appears in the printed specification of the above numbered patent requiring correction as follows: Page 4, line 25, for "combined" read "confined"; and that the said Letters Patent should be read with this correction therein that the same may conform to the record of the case in the Patent Office.

Signed and sealed this 13th day of December A. D. 1932.

(Seal)

M. J. Moore,
Acting Commissioner of Patents.